United States Patent [19]
Bonura

[11] Patent Number: 6,011,340
[45] Date of Patent: Jan. 4, 2000

[54] DYNAMO-ELECTRIC APPARATUS AND METHODS FOR MANUFACTURING

[75] Inventor: Walter Bonura, Florence, Italy

[73] Assignee: Axis USA, Inc., Tampa, Fla.

[21] Appl. No.: 09/280,032

[22] Filed: Mar. 26, 1999

Related U.S. Application Data

[60] Provisional application No. 60/082,806, Apr. 22, 1998.

[51] Int. Cl.[7] .................................................. H02K 1/12
[52] U.S. Cl. ........................ 310/216; 310/260; 310/267; 310/91; 310/97; 29/596; 29/598; 29/736
[58] Field of Search ..................................... 310/254, 260, 310/267, 91, 71, 68 B; 29/596, 598, 736

[56] References Cited

U.S. PATENT DOCUMENTS

| | | | |
|---|---|---|---|
| 3,737,988 | 6/1973 | Bednarski ................................... | 29/596 |
| 5,124,602 | 6/1992 | Nishimura et al. .................... | 310/68 B |
| 5,493,770 | 2/1996 | Anichini et al. ........................... | 29/597 |
| 5,889,345 | 3/1999 | Iwata et al. ............................... | 310/71 |
| 5,907,208 | 5/1999 | Kristen et al. ............................ | 310/261 |

*Primary Examiner*—Clayton LaBalle
*Assistant Examiner*—Saeed Ghahramani
*Attorney, Agent, or Firm*—Fish & Neave; Robert R. Jackson; Walter M. Egbert, III

[57] ABSTRACT

A dynamo-electric core which has a lamination stack defining an axial bore therethrough is wrapped by a wire coil having a coil lead. A mounting member is axially movable within said axial bore between a first position and a second position. A coil lead anchoring structure is positioned adjacent an end portion of said mounting member and is axially movable with said mounting member. When the mounting member is in the first position, there is adequate space for winding apparatus and fusing apparatus for placing and securing the coil lead to the coil lead anchoring structure. When the mounting member is in the second position, the axial length of the dynamo-electric core is reduced.

23 Claims, 2 Drawing Sheets

6,011,340

DYNAMO-ELECTRIC APPARATUS AND METHODS FOR MANUFACTURING

CROSS-REFERENCE TO RELATED APPLICATIONS

This application claims the benefit of United States provisional patent application Ser. No. 60/082,806, filed Apr. 22, 1998.

BACKGROUND OF THE INVENTION

The present application relates to cores for dynamo-electric machines and methods for manufacturing such cores, and more particularly to those of brushless motors.

The stator core of a typical dynamo-electric machine has a lamination stack and insulation end boards. Coils of wire are wrapped around the stack and end boards. Coil leads, extending from the wire coils, are drawn and wrapped around respective terminal posts located at an axial end portion of the stator assembly. The terminal posts, in turn, are electrically connected to circuitry that generates commutation signals to cause rotation of a rotor assembly with respect to the stator.

In the prior art, terminal posts are typically fixed directly to the insulation end board adjacent the wire coils, and are not movable with respect to the insulation end board of wire coils. The known terminal post configuration presents several disadvantages in view of conflicting design considerations. For example, the terminal posts must provide sufficient structural support at the anchoring point as well as adequate clearance for apparatus used in the manufacturing process.

Winding of the coils and wrapping of the leads around the terminal posts for a typical stator can be accomplished by a traditional flyer winder, which rotates about the stator to dispense the wire. When using a flyer winder, there should be a minimum axial clearance between the ends of the coils and the terminal posts to accommodate the path of the flyer and wire strand. Furthermore, the terminal posts must be sufficiently strong to withstand the loads from the winder during the wrapping of the leads around the terminal posts.

Subsequently, the leads are fused to the terminals, particularly if tang-type terminals are used. Sufficient axial clearance between the end of the coil and the terminal post may be necessary during the fusing operation to allow access for an electrode assembly. Once the leads have been fused to the terminals, the terminals must have sufficient structure to hold the lead in place.

The above requirements of clearance and strength produce a terminal configuration having increased axial length and terminal support structure. This is in conflict with another design consideration that teaches that the stator should be as compact as possible in the axial dimension to meet space constraints, for example. The prior art terminal posts designs, therefore, do not address this concern.

In view of the foregoing, it is an object of this invention to provide a stator design and method of manufacture which provides sufficient strength and access for manufacturing equipment.

It is a further object to provide a stator design and method of manufacture which results in compact overall dimensions.

SUMMARY OF THE INVENTION

These and other objects are accomplished in accordance with the principles of this invention by providing a lamination stack having an axial bore therethrough and a wire coil wrapped around the lamination stack. A mounting member is movable within the axial bore between a first position and second position. A coil lead anchoring structure is provided adjacent an end portion of the mounting member and is axially movable with the mounting member. After winding and fusing the coil lead to the coil lead anchoring structure while the mounting member is in the first position, the mounting member and the coil lead anchoring structure can be pushed in the axial direction to the second position. In a preferred embodiment, the coil lead anchoring structure may be a tang-type terminal fixed to the mounting member, such as a cylindrical tube. The axial movement of the mounting member may bring an abutment surface, such as a raised wall portion on the mounting member, into abutment with another abutment surface, i.e., another raised wall portion, on an insulation end board adjacent the lamination stack.

The configuration according to the subject invention makes it possible to have sufficient spacing on the dynamo-electric core between the lamination stack and the coil lead anchoring structure, for accomplishing winding and fusing with conventional operations, and to reduce this spacing once these operations have been accomplished. This results in optimizing the overall dimensions, while having sufficient structure for the bases of the terminal posts so that the latter can be held firmly.

BRIEF DESCRIPTION OF THE DRAWINGS

The above and other features of this invention, its nature, and various advantages will be apparent from the following detailed description of the preferred embodiments, taken in conjunction with the accompanying drawings, in which like reference characters represent like elements throughout, and in which.

DETAILED DESCRIPTION OF THE PREFERRED EMBODIMENTS

Figure 1:
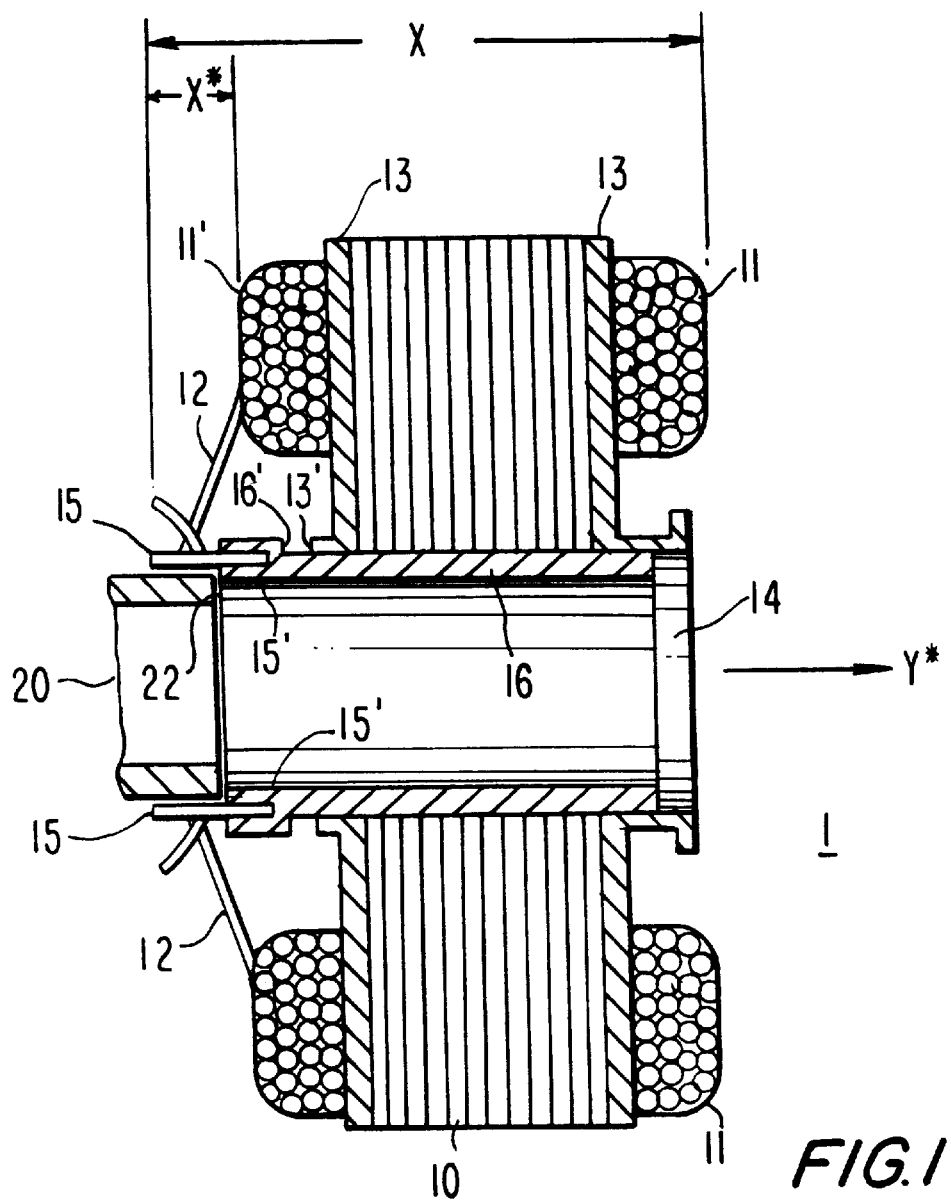
FIG. 1 is a simplified cross-sectional view of the subject apparatus in a first configuration.

Referring now in detail to the drawings, FIG. 1 shows a stator, having a lamination stack 10 defining an opening, such as axial, cylindrical bore 14. Insulation end boards 13 are provided on opposite axial ends of lamination stack 10. Wound coils of wire 11 are placed around the stack 10 and end boards 13, by a flyer winder or other winding apparatus. An axially movable terminal mounting member is slidably positioned with respect to stack 10. In a preferred embodiment, the terminal mounting member is tube 16, which is positioned within the axial cylindrical bore 14 of stack 10. Tube 16 is provided with base anchoring structures 15' at an axial end portion thereof, in which coil lead anchoring structures, such as terminal posts 15, are mounted. Coil leads 12 are drawn from the coils 11 and are wrapped around respective terminal posts 15, which are, in turn, connected to circuitry (not shown) able to generate commutation signals.

As described above, it is desirable for the stator 1 shown in FIG. 1 to be as compact as possible. For example, the overall axial dimension X is partially influenced by the position where terminal posts 15 have their base anchoring structures 15', and by the length of the terminal posts 15 themselves.

An axial clearance dimension is defined between the ends 11' of the coils 11 and the terminal posts 15. The minimum axial clearance X* is determined by a number of factors, particularly the access space required by electrode assembly equipment and winding apparatus.

In a preferred embodiment, terminal posts 15 are of the tang-type. Winding of the coils and wrapping of the leads around the terminal posts for a stator like the one shown in FIG. 1 can be accomplished by a traditional flyer winder. The related operating principles for winding and wrapping the leads of a stator like the one shown in FIG. 1 are known to the technician of the art. These operating principles require that there be a minimum clearance X*, between the ends 11' of the coils 11 and terminals posts 15, which is required for components of the winder to operate according to known principles.

The tang-type terminals are typically fused after the coil leads have been wrapped around them. Fusing provides good electrical contact and a strong mechanical bond between the lead and the tang. The minimum axial clearance X* is also determined the fusing operation, due to space needed for introduction of the electrode assembly used to deform the tang.

The invention, as described herein, makes it possible to provide this required spacing on the stator for accomplishing winding and fusing with conventional methods, and to subsequently reduce this spacing, and thus the overall dimensions, such as axial dimension X, once these operations have been accomplished.

Figure 1A:
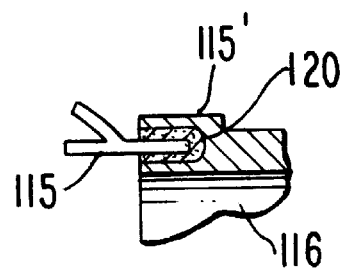
FIG. 1(a) is a fragmentary sectional view illustrating an alternative embodiment of the apparatus of FIG. 1.

As illustrated in FIG. 1, tube 16 is configured for relative movement in the axial direction Y* with respect to stack 10, end boards 13 and coil 11. Terminal posts 15 are mounted in base structures 15' at an end portion of tube 16. Tube 16 may be fabricated from an electrically insulative material. In an alternative embodiment, tube 116 is metal, and an insulative sleeve or mount 120 is provided between terminal posts 115 and tube 116 (See, FIG. 1a.). Tube 16 is provided with an abutment surface, raised wall portion, or ridge 16', configured to cooperate with an abutment surface, or ridge 13', provided at an end portion of insulating board 13. FIG. 1 illustrates the relative positioning of tube 16 in a starting configuration such that ridge 16' is spaced apart from ridge 13'. The axial clearance X* is thus provided, such that winding or fusing operations may proceed with sufficient access for the manufacturing equipment.

After the manufacturing operations are completed, tube 16 can be pushed in direction Y* to bring ridge 16' into approximation with ridge 13' of insulation end board 13. Exemplary apparatus for moving tube 16 in direction Y* is pusher member 20. Pusher member 20 may be a substantially cylindrical ring having an engagement surface 22 configured to contact tube 16. Moreover, pusher member 20 may be sized to fit between terminals 15 to prevent damaging the terminals when applying a force to tube 16. In a preferred embodiment, pusher member 20 is used in connection with an actuator and an automatic control system to move tube 16 with respect to stack 10. According to a position feedback control system, pusher member 20 moves tube 16 with respect to stack 10 until tube 16 is in the desired position. Alternatively, a force feedback control system may be implemented such that pusher member 20 moves tube 16 until a particular resistance force is detected, e.g., increased force upon the abutment of ridge 13' with ridge 16'. It is understood that the configuration of pusher member 20 and control system implementation are exemplary, and it is contemplated that member 20 may assume any appropriate configuration to engage and move tube 16, and control system may be substituted with an alternative feedback control system, automated open loop system, or a manual configuration.

Figure 2:
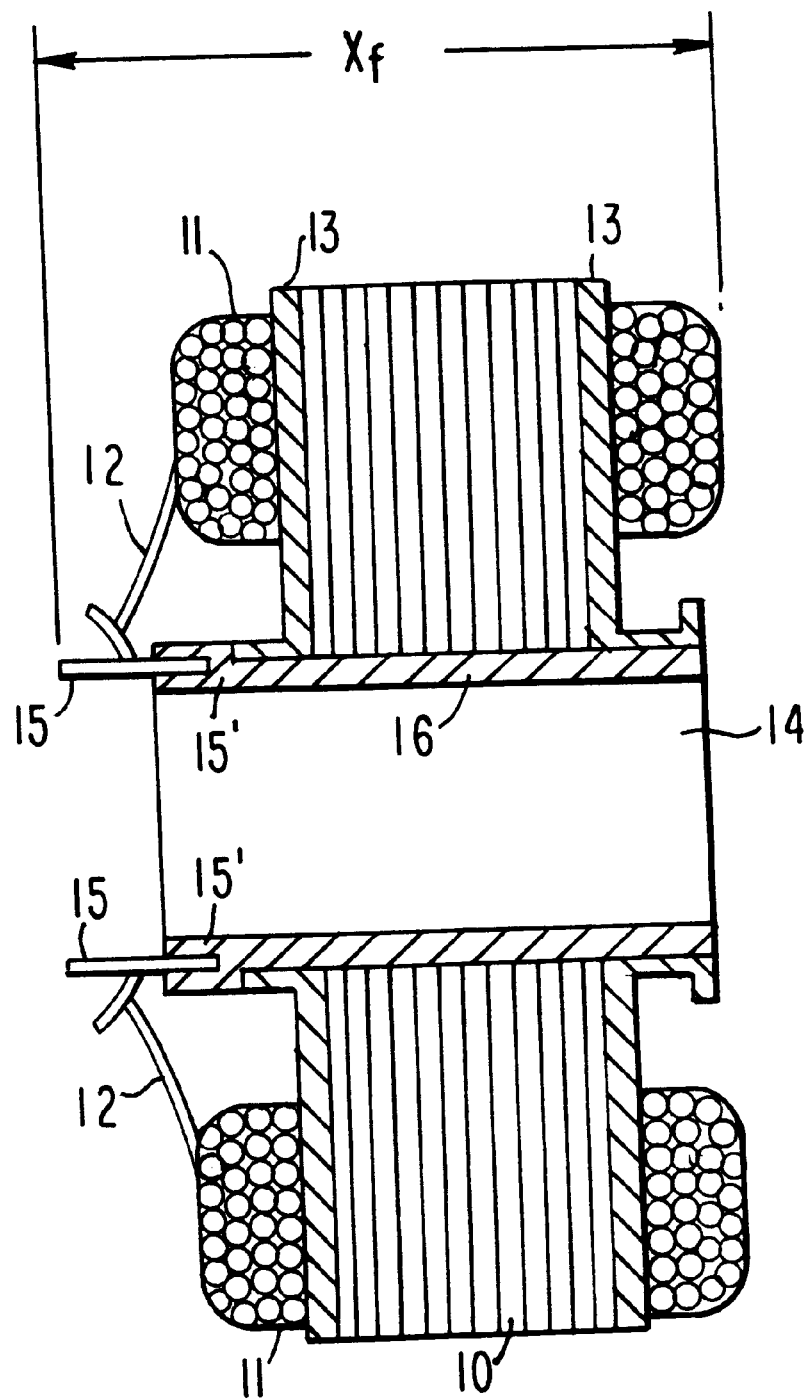
FIG. 2 is a simplified cross-sectional view of the apparatus of FIG. 1 in a second configuration.

FIG. 2 illustrates the stator in a compact configuration in comparison with the configuration shown in FIG. 1. Following the approximation of tube ridge 16' with end board ridge 13', the stator defines an overall axial dimension $X_f$, which is smaller than the initial dimension X. A friction fit between tube 16 and the surrounding insulation board 13 will allow a predetermined pushing force in direction Y* to move tube 16, in order to reach abutment with ridge 13', and to maintain the tube stationary when this force is removed. Alternatively, tube 16 may be secured to stack 11 using known securement means such as resin, glue, or welding.

It will be understood that the foregoing is only illustrative of the principles of the invention, and that various modifications can be made by those skilled in the art without departing from the scope and spirit of the invention. For example, the terminal posts may have any number of movable configurations other than the tang-type illustrated herein. Moreover, although the invention has been illustrated in the context of stators for brushless motors, the invention is equally applicable to other machine parts having wire coils, leads and terminals.

The invention claimed is:

1. A dynamo-electric core comprising:
   a lamination stack defining an axial bore therethrough;
   a mounting member axially movable within said axial bore between a first position and a second position;
   a coil lead anchoring structure positioned adjacent an end portion of said mounting member and axially movable with said mounting member; and
   a wire coil wrapped about said lamination stack and having a coil lead attached to said coil lead anchoring structure.

2. The dynamo-electric core defined in claim 1, wherein said dynamo-electric core defines a first axial length when said mounting member is in said first position, and a second axial length when said mounting member is in said second position.

3. The dynamo-electric core defined in claim 1, wherein said lamination stack defines a first abutment surface and said mounting member defines a second abutment surface, and wherein said first and second abutment surfaces are spaced apart when said mounting member is in said first position and said first and second abutment surfaces are approximated when said mounting member is in said second position.

4. The dynamo-electric core defined in claim 1, wherein said lamination stack defines a first abutment surface and said mounting member defines a second abutment surface, said first and second abutment surfaces being configured to contact one another and to inhibit further relative axial movement of said mounting member with respect to said lamination stack when said first and second abutment surfaces are in contact.

5. The dynamo-electric core defined in claim 4, wherein said lamination stack further comprises an insulation board at an axial end portion of said lamination stack, and said first abutment surface is a raised wall portion defined on said insulation board.

6. The dynamo-electric core defined in claim 4, wherein the second abutment surface is a raised wall portion on said mounting member.

7. The dynamo-electric core defined in claim 1, wherein the axial bore and the mounting member are sized and configured to provide a frictional fit, such that said mounting member is fixed with respect to said lamination stack when an axial force applied to said mounting member is below a predetermined threshold force.

8. The dynamo-electric core defined in claim 1, wherein the axial bore and the mounting member are secured together with an adhesive material.

9. The dynamo-electric core defined in claim 1, wherein the coil lead anchoring structure is a tang-type terminal.

10. The dynamo-electric defined in claim 1, wherein the mounting member is fabricated of an electrically insulative material.

11. The dynamo-electric core defined in claim 1, further comprising:

an electrically insulative sleeve positioned between said coil lead anchoring structure and said mounting member.

12. The dynamo-electric defined in claim 1, wherein the mounting member is substantially cylindrical and defines a second axial bore therethrough.

13. The dynamo-electric core defined in claim 1, wherein a first predetermined axial spacing is defined between said coil lead anchoring structure and said wire coil in said first position, and a second, reduced axial spacing is defined in said second position.

14. The dynamo-electric core defined in claim 12, wherein said first axial spacing is selected to provide sufficient axial clearance to receive apparatus for securing the coil lead to the coil lead anchoring structure.

15. A method for manufacturing an dynamo-electric machine having a lamination stack defining an axial bore therethrough and a wire coil about said lamination stack, comprising:

providing a mounting member axially movable within said axial bore and a coil lead anchoring structure positioned adjacent an end portion of said mounting member and axially movable with the mounting member;

attaching one of said coil leads to said coil lead anchoring structure while defining a first axial spacing between said coil lead anchoring structure and said wire coil; and moving said mounting member and said coil lead anchoring structure axially towards said wire coil, thereby defining a second axial spacing therebetween.

16. The method defined in claim 15, wherein the dynamo-electric core defines an axial length, the step of moving said mounting member and said coil lead anchoring structure axially towards said wire coil comprises:

reducing the axial length of the dynamo-electric core.

17. The method defined in claim 15, wherein the step of attaching comprises:

winding said coil lead about said coil lead anchoring structure.

18. The method defined in claim 17, wherein the step of attaching comprises:

fusing the coil lead to the coil lead anchoring structure.

19. The method defined in claim 18, wherein said first axial spacing is selected to accommodate a fusing apparatus, and the step of attaching further comprises:

inserting said fusing apparatus into a space defined by the coil lead anchoring structure and the wire coil.

20. The method defined in claim 15, wherein the axial bore and the mounting member are sized and configured to provide a frictional fit, such that said mounting member is fixed with respect to said lamination stack when an axial force applied to said mounting member is below a predetermined threshold force, and wherein the step of moving said mounting member and said coil lead anchoring structure axially further comprising:

applying a force exceeding the threshold force to move said mounting member and said coil lead anchoring structure.

21. The method defined in claim 15, wherein said lamination stack defines a first abutment surface and said mounting member defines a second abutment surface, said first and second abutment surfaces being configured to contact one another and to inhibit further relative axial movement of said mounting member with respect to said lamination stack when said first and second abutment surfaces are in contact, and wherein the step of moving said mounting member and said coil lead anchoring structure axially further comprising:

moving said mounting member and said coil lead anchoring structure until said first and second abutment surfaces are in contact.

22. A dynamo-electric core comprising:

a lamination stack;

a mounting member movable with respect to said lamination stack between a first position and a second position such that the dynamo-electric core defines a reduced dimension when the mounting member is in the second position;

a coil lead anchoring structure positioned adjacent an end portion of said mounting member and axially movable with said mounting member; and a wire coil wrapped about said lamination stack and having a coil lead attached to said coil lead anchoring structure.

23. Apparatus for manufacturing the dynamo-electric core defined in claim 22, comprising:

means for moving the mounting member with respect to the lamination stack.

* * * * *